Feb. 27, 1968   O. A. OPPERTHAUSER   3,370,815
SHOCK ABSORBING PAD FOR CONDUIT CLAMPING DEVICE
Filed Sept. 13, 1965
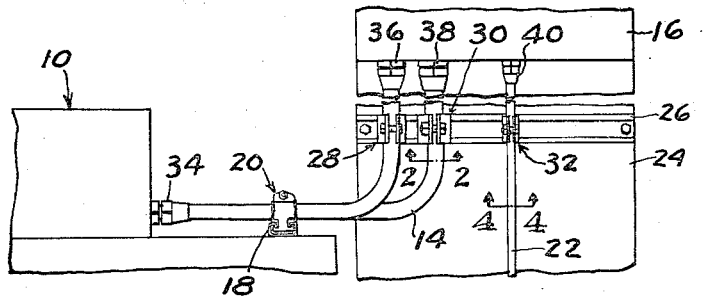
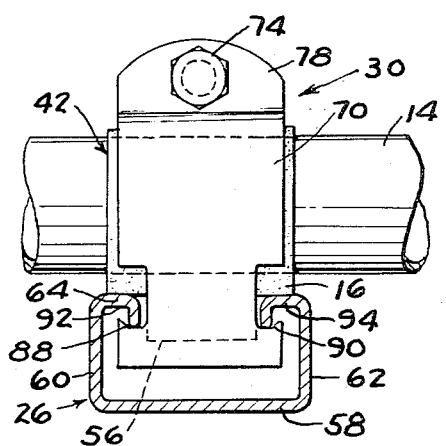
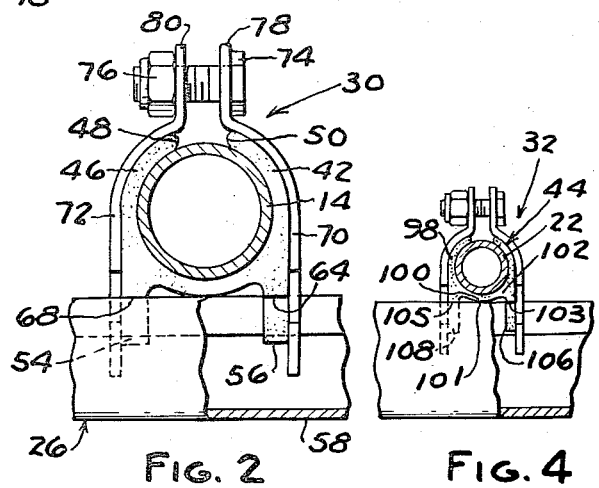
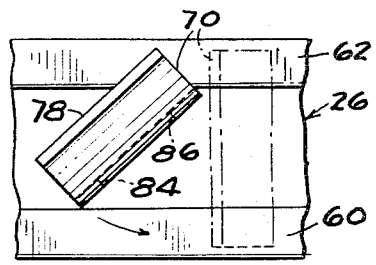
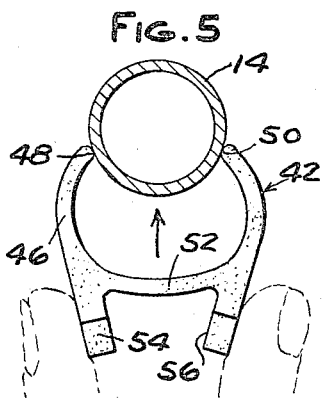
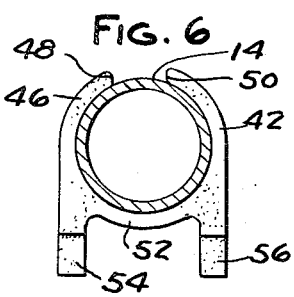
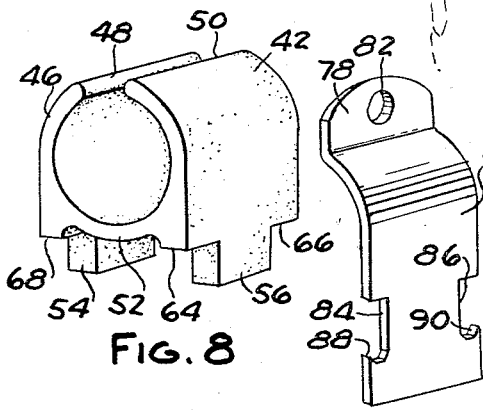
INVENTOR.
ORVAL A. OPPERTHAUSER
BY
Barnes, Kisselle, Raisch & Choate
ATTORNEYS United States Patent Office 3,370,815
Patented Feb. 27, 1968

3,370,815
SHOCK ABSORBING PAD FOR CONDUIT
CLAMPING DEVICE
Orval A. Opperthauser, Bloomfield Township, Oakland County, Mich., assignor to F. Joseph Lamb Co., Warren, Mich., a corporation of Michigan
Filed Sept. 13, 1965, Ser. No. 486,792
5 Claims. (Cl. 248—74)

ABSTRACT OF THE DISCLOSURE

A shock absorbing pad for a conduit in the form of a split sleeve having flat shoulders on one side thereof for seating against inwardly turned flanges of a supporting channel with a pilot portion extending inwardly of the channel support between the channel flanges and with a pair of clamping brackets hooked under the flanges and extending around the sleeve for securely clamping the conduit within the sleeve and the sleeve on the flanges of the channel.

---

This invention relates generally to clamp pads, and in particular to a shock absorbing pad for a clamping device for securing a conduit to a machine tool or other support.

Hydraulic lines, which are often associated with machine tools, are subjected to vibrations and occasionally to severe shocks produced by sudden changes in the pressure of hydraulic fluid in the lines. In many manufacturing operations, the hydraulic lines run from machine to machine and are supported directly on the machines, so the vibrations of the machines are transmitted to the lines. It is evident that such vibrations and shocks may cause loosening of fittings, leaks, broken joints and other damage to the lines or conduits.

It is an object of this invention to provide an improved pad for the clamping devices which secure conduits to machine tools or other supports for absorbing shocks and vibrations to reduce damage to the conduits.

Another object of the invention is to provide a clamp pad which can be easily slipped on and off a conduit, but which grips the conduit when it is on it.

Another object of the invention is to provide a one-piece clamp pad to encircle a conduit which can be opened to put it on or take it off the conduit.

Another object of the invention is to provide a structure on the clamp pad to facilitate applying force to the pad for opening it up.

A further object of the invention is to provide an improved combination of clamping device and shock-absorbing clamp pad particularly adapted for securing a conduit to a channel member.

In the drawings:

FIG. 1 is a fragmentary elevational view showing part of a machine tool and a hydraulic system associated with it.

FIG. 2 is a sectional view taken along line 2—2 of FIG. 1, showing a clamping device, a clamp pad and a channel support according to the present invention.

FIG. 3 is a vertical section through the channel support of FIG. 2 and shows one side of the clamping device.

FIG. 4 is a sectional view similar to FIG. 2 but showing a smaller size clamping device and clamp pad for a smaller diameter conduit, the section being taken along line 4—4 of FIG. 1.

FIG. 5 illustrates the manner in which force is applied manually to the clamp pad to open it and slip it on a conduit.

FIG. 6 shows the clamp pad in place on the conduit.

FIG. 7 shows one element of the clamping device being put in the channel support.

FIG. 8 is a perspective view of the clamp pad.

FIG. 9 is a perspective view of one clamp element having hook-shaped edges near the bottom of the element for engaging the channel support.

FIG. 10 is an end view of a modification of the clamp pad.

FIG. 11 is an end view of a pad of the same type as that shown in FIG. 4 but in a larger size.

The clamp pad of the invention has a generally tubular or annular sleeve of resiliently flexible material, such as nylon plastic, which is somewhat C-shaped in cross-section so that it can partially encircle and grip a conduit. As a result of the C-shaped section, the sleeve has two free edges at its front side which extend axially of the sleeve and which are preferably spaced apart a distance less than the inside diameter of the sleeve. At the back of the sleeve there are two finger-like projections or legs which are integral with the sleeve and of the same material, and these projections serve as levers which can be pressed toward each other to bend the sleeve outwardly and thereby spread the edges of the sleeve so that it will slip on or off a conduit easily. The projections also act as pilots to properly locate the sleeve relative to a channel support. A generally U-shaped clamping device is provided which embraces the clamp pad and engages the channel support to secure the conduit firmly to the channel support.

Referring to the drawings, there is shown in FIG. 1 part of a machine tool 10 and hydraulic lines or conduits 12 and 14 which lead to a hydraulic system 16. Conduits 12 and 14 are anchored to the machine tool 10 by channel support 18 and two clamping devices, only one such device 20 being visible in this view. A third conduit 22 also leads to the hydraulic system 16 and all three conduits 12, 14 and 22 are anchored to a panel 24 by another channel support 26 and three clamping devices 28, 30 and 32. The conduits have fittings 34, 36, 38 and 40, and it is evident that vibrations of the machine and shocks produced, for example, by surges of hydraulic fluid or by suddenly shutting off hydraulic pressure in the conduits, could loosen these fittings and could otherwise damage the conduits and fittings. In order to minimize the adverse effects of such vibrations and shocks, each of the clamping devices 20, 28, 30 and 32 is provided with a shock-absorbing pad in accordance with the invention. Such pads 42 and 44 for clamping devices 30 and 32 are shown in FIGS. 2, 3 and 4.

FIG. 8 is a detail view of pad 42 and will be described along with FIGS. 2 and 3. Pad 42 is made of a resilient, flexible material, preferably nylon plastic, which gives the pad its shock-absorbing capability and also makes it possible to open the pad when placing it on or removing it from a conduit, as will be described more fully in connection with FIGS. 5 and 6. Pad 42 includes a generally tubular or annular sleeve 46 which has a C-shape as viewed in cross-section (FIG. 2), or as viewed from one end (FIG. 8).

Sleeve 46 has two free edges 48 and 50. In this description, the free edges will be referred to as located on the front side of the sleeve and the curved sleeve portion 52 will be referred to as located on the back side of the sleeve for purposes of reference. Edges 48 and 50 extend axially of the sleeve and are separated from each other by a distance less than the inside diameter of the sleeve. This limited separation of edges 48 and 50 is desirable from the standpoint of assuring that the sleeve grips conduit 14. The inside diameter of sleeve 46 in its free condition may be slightly smaller than the outside diameter of conduit 14, if desired, so when pad 42 is in place on the conduit, as in FIG. 2, its free edges 48 and 50 are spaced apart slightly more than in their free position (FIG. 8) and sleeve 46 grips the conduit due to the resiliency of the material of the sleeve. However, the inside diameter of the sleeve need not be less than the outer diameter of the conduit.

Pad 42 also includes two projections 54 and 56 in the form of fingers, which preferably are integral with sleeve 46 and are made of the same material. Fingers 54 and 56 extend from the back side 52 of sleeve 46, and in the embodiments shown in the drawings, the fingers are parallel to each other. A parallel arrangement of the fingers is not essential, but they should be spaced from each other and arranged such that they may be conveniently pressed toward each other to open up the sleeve.

As shown in FIGS. 2 and 3, fingers 54 and 56 are received within a channel support 26 which has a base 58 and side walls 60 and 62. Each finger of the pad has shoulders 64, 66 which rest on the inwardly turned flanges at the free edges of the side walls 60 and 62 of channel support 26, the shoulders being shown most clearly in FIG. 8. One shoulder 64 associated with finger 56 is visible in FIG. 2 and the manner in which these shoulders and back portion 52 of sleeve 46 seat on the flanges of channel support 26 is evident in FIGS. 2 and 3. Fingers 54 and 56 are located between free edges of flanges on the side walls 60 and 62 of channel support 26 (FIG. 3), and they act as pilots which guide the clamp pad 42 to the proper position when it is inserted in the channel.

Clamping device 30 (FIGS. 2 and 3) includes two curved metal straps 70 and 72 secured together by a bolt 74 and a nut 76 into a generally U-shaped clamp which embraces clamp pad 42, as shown in FIG. 2. Straps 70 and 72 have flat parallel extensions 78 and 80 through which bolt 74 passes and which are drawn toward each other when the nut and bolt are tightened.

The configuration of one strap 70 is shown best in FIG. 9. A hole 82 in extension 78 receives bolt 74. Near the bottom of strap 70 there are recessed edges 84 and 86 which have a hook-shaped configuration at 88 and 90. These hook-shaped edges engage complemental hook-shaped portions 92 and 94 at the top edges of the side walls of channel support 26 (FIG. 3) to retain the clamping device in the channel member 26. When bolt 74 and 76 are tightened, hook-shaped strap edges 88 and 90 are pulled against hook-shaped portions 92 and 94 of the channel member 26 to forcibly interengage the channel member and the clamping device.

Clamping device 32 of FIG. 4 is almost identical to device 30 of FIG. 2, so device 32 will be described only briefly. It may be seen that the back portion 100 of sleeve 98 has a flat exterior surface 101 which seats on inwardly turned flanges of channel 26 along with shoulders 103 and 105. There are two regions 102 and 104 on opposite sides of surface 101 which have a smaller cross-section than the remainder of back portion 100. The regions 102 and 104 of reduced section serve to concentrate bending at those regions so that the device may be opened relatively easily. The regions 102 and 104 of reduced section adjoin the fingers 106 and 108 of pad 44. Rather than providing two such regions of reduced section, it is possible to reduce the section of the sleeve at 100 midway between the fingers.

Clamp pad 32a of FIG. 11 is identical to pad 32 of FIG. 4, but it is larger for use with a larger size conduit. The shoulders 103, 105 and the flat surface 101 which seat on the inwardly turned flanges of the channel are evident here as well as the regions 102 and 104 of reduced section.

FIG. 10 shows a modification wherein clamp pad 112 has a flat surface 114 at each end of sleeve 116 and on opposite sides of the fingers 118 and 120. Surfaces 114 seat on the inwardly turned flanges at the top edges of a channel, such as channel 26, when pad 112 is assembled with the channel. It may be seen that region 122 between fingers 118 and 120 is thinner in section than the remainder of the back portion of sleeve 116. Thus, this pad 112 has a single region of reduced section in its back portion whereas pads 32 and 32a of FIGS. 4 and 11 have two regions of reduced section in their back portions.

FIG. 5 illustrates a clamp pad 42 being opened and slipped on conduit 14, and FIG. 6 shows clamp pad 42 in place on a conduit. In FIG. 5 manual pressure has been applied to fingers 54 and 56 of pad 42 to move those fingers toward each other and thereby bend sleeve 46 to spread its free edges 48 and 50 apart. By applying slightly more pressure, edges 48 and 50 may be opened enough to clear conduit 14, and pad 42 can then be slipped over the conduit. Fingers 54 and 56 have a thicker section than sleeve 46, so the fingers do not bend very much. When fingers 54 and 56 are released, sleeve 46 closes around conduit 14.

After clamp pad 42 is arranged on the conduit in the proper location, the channel support 26 may be assembled with the pad and conduit. The clamping device 30 is then applied to anchor the conduit to channel support 26. FIG. 7 shows one of the clamp straps 70 in two positions as it is being put into the channel support 26. The bottom end of strap 70, where hooked edges 88 and 90 are located, is inserted between the inwardly turned flanges on side walls 60 and 62 of channel member 26, and this may be done by positioning strap 70 at an acute angle relative to side walls 60 and 62 and inserting strap 70 between side walls 60 and 62 in the manner shown with solid lines in FIG. 7. Strap 70 is then turned until it is perpendicular to side walls 60 and 62 of channel 26, and this position of strap 70 is shown in broken lines in FIG. 7. The other strap 72 is inserted in the channel in the same manner and the two straps are brought together over clamp pad 42 and bolted as previously described to firmly lock the conduit to the channel in fixed position. Pad 42 thus provides a cushioning element between the conduit and its mounting structure which is admirably adapted to absorb shocks to which the assembly may be subjected. Noise is reduced because the pads dampen vibrations. The pad separates the clamp from the conduit and so eliminates abrading between the clamp and the conduit. Since the pad can be adjusted easily to its proper position relative to the channel, the conduit is not likely to become distorted during installation of the clamps. If there is any remaining misalignment of one clamp relative to another, it is taken up by the give of the material.

Thus the invention provides a clamp pad capable of absorbing shocks and vibrational stresses. The pad can be easily slipped on and off a conduit after the conduit is connected into a hydraulic system and can be assembled quickly and conveniently with a clamping device as described above.

I claim:

1. A shock absorbing pad usable for securing a conduit to a channel-shaped support, said pad comprising a generally tubular, split sleeve of resiliently flexible material having two free edges extending in a direction axially of the sleeve on one side thereof which are separable for circumferentially enlarging the sleeve to receive a conduit therein, a pair of fingers integrally joined to the sleeve, said fingers extending in generally parallel relation and in the same direction from generally opposite side portions of the sleeve, said fingers extending at their free ends beyond the outer periphery of the sleeve, the opposite side edges of each finger being notched inwardly so that the free end portions of the fingers are of reduced width and form generally square shoulders with the portions of the fingers joined with the sleeve, said shoulders lying in a plane closely adjacent the periphery of the portion of the sleeve extending between the fingers so that the pad may be arranged on a channel-shaped support having inwardly turned flanges with said shoulders seated on the flanges and with the reduced portions of the fingers projecting inwardly of the channel between the inner opposed edges of the flanges thereon.

2. A shock absorbing pad as called for in claim 1 wherein the fingers extend from the sleeve in a direction generally opposite from the location of the free edges of the sleeve so that the reduced end portions of the fingers are adapted to be squeezed together to separate the free edges and thereby circumferentially enlarge the sleeve for the reception of a conduit.

3. In combination a channel-shaped support having inwardly turned flanges extending longitudinally along the free edges thereof, a conduit extending transversely of the channel, a shock absorbing pad encircling said conduit and supported on said channel, said shock absorbing pad comprising a generally tubular, split sleeve of resiliently flexible material having two free edges extending in a direction axially of the sleeve on one side thereof which are separable for circumferentially enlarging the sleeve to receive the conduit therein, a pair of fingers integrally joined to the sleeve, said fingers extending in generally parallel relation and in the same direction from generally opposite side portions of the sleeve, said fingers extending at their free ends beyond the outer periphery of the sleeve, the opposite side edges of each finger being notched inwardly so that the free end portions of the fingers are of reduced width and form generally square shoulders with the portions of the fingers joined with the sleeve, said shoulders lying in a plane closely adjacent the outer periphery of the portion of the sleeve extending between the fingers, said pad being arranged on said channel-shaped support with said shoulders seated on the inwardly turned flanges and with the reduced portions of the fingers extending inwardly of the channel between the inner edges of said inwardly turned flanges and symmetrically shaped clamp means including means complementally formed to said inwardly turned flanges for operatively engaging with said channel-shaped support and means complementally formed to said split sleeve for operatively encircling said sleeve for clamping said sleeve and conduit on the channel-shaped support.

4. The combination called for in claim 3 wherein the width of said reduced portions of the fingers corresponds generally with the distance between the inner edges of said inwardly turned flanges.

5. The combination called for in claim 3 wherein said free edges of the pad and said fingers are disposed on generally diametrically opposite sides of the conduit within the pad.

References Cited

UNITED STATES PATENTS

| Re. 22,846 | 2/1947 | Morehouse | 248—74 |
| 2,365,985 | 12/1944 | West | 248—74 |
| 2,375,513 | 5/1945 | Bach | 248—73 X |
| 2,674,431 | 4/1954 | Attwood | 248—73 X |
| 2,761,714 | 9/1956 | Cuskie | 248—74 X |
| 3,042,352 | 7/1962 | Stamper | 248—73 X |
| 3,185,419 | 5/1965 | Kindorf | 248—73 |
| 3,244,803 | 4/1966 | Becker | 248—74 X |
| 3,301,514 | 1/1967 | Sugaya | 248—73 X |
| 3,266,761 | 8/1966 | Walton et al. | 248—74 |

FOREIGN PATENTS 1,230,280   9/1960   France.

SAMUEL ROTHBERG, *Primary Examiner.*

N. C. CUDDEBACK, *Assistant Examiner.*